(12) United States Patent
Wilkens et al.

(10) Patent No.: US 11,154,898 B2
(45) Date of Patent: Oct. 26, 2021

(54) FUEL TANK SEALANT APPLICATION SYSTEM

(71) Applicant: Honda Patents & Technologies North America, LLC, Torrance, CA (US)

(72) Inventors: Kevin Michael Wilkens, Hilliard, OH (US); Brian Duncan Ray, Dublin, OH (US); John Jeffrey Carter, Marysville, OH (US); Michael Dale Bullard, Sophia, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 587 days.

(21) Appl. No.: 15/927,433

(22) Filed: Mar. 21, 2018

(65) Prior Publication Data

US 2019/0291130 A1   Sep. 26, 2019

(51) Int. Cl.
| | | |
|---|---|---|
| *B05C 11/10* | (2006.01) | |
| *B64F 5/10* | (2017.01) | |
| *B05B 13/04* | (2006.01) | |
| *B25J 11/00* | (2006.01) | |
| *B64C 3/34* | (2006.01) | |
| *F16J 15/14* | (2006.01) | |

(52) U.S. Cl.
CPC ...... *B05C 11/1034* (2013.01); *B05B 13/0431* (2013.01); *B05C 11/1005* (2013.01); *B25J 11/0075* (2013.01); *B64C 3/34* (2013.01); *B64F 5/10* (2017.01); *F16J 15/14* (2013.01)

(58) Field of Classification Search
USPC ........ 118/695–697, 683, 684, 679–682, 712, 118/713
See application file for complete search history.

(56) References Cited

U.S. PATENT DOCUMENTS

| | | | |
|---|---|---|---|
| 4,964,362 A | * | 10/1990 | Dominguez .......... B05C 5/0216 118/315 |
| 7,277,266 B1 | | 10/2007 | Le et al. |
| 7,969,706 B2 | | 6/2011 | Heeter et al. |
| 9,376,217 B2 | | 6/2016 | Yamakoshi et al. |
| 9,393,651 B2 | | 7/2016 | Dan-Jumbo et al. |
| (Continued) | | | |

OTHER PUBLICATIONS

Nordson Sealant Equipment; Aerospace Dispense Systems; 5-pages.

*Primary Examiner* — Yewebdar T Tadesse
(74) *Attorney, Agent, or Firm* — Stinson LLP (57) ABSTRACT

An application system includes one or more flow control mechanisms controlling a flow path to a dispenser device, one or more position control mechanisms controlling a position of the dispenser device, and a memory device storing data associated with the flow control mechanisms, the position control mechanisms, one or more target areas, and computer-executable instructions. The computer-executable instructions may be executed to identify a target area, actuate the position control mechanisms to move the dispenser device toward the target area, actuate the flow control mechanisms to channel the sealant materials toward the dispenser device, dispense one or more first shots of the sealant materials onto the target area using the dispenser device for forming a dollop at the target area, and dispense one or more second shots of the sealant materials onto the target area using the dispenser device for forming a sealant layer that overlies the dollop.

14 Claims, 5 Drawing Sheets

(56) References Cited

U.S. PATENT DOCUMENTS

| | | | |
|---|---|---|---|
| 9,475,587 B2 | 10/2016 | Nishimura et al. | |
| 2002/0182339 A1* | 12/2002 | Taylor | C08L 2666/14 427/510 |
| 2004/0005411 A1* | 1/2004 | Hubert | B25J 5/02 427/256 |
| 2005/0048206 A1* | 3/2005 | Chinander | B05C 17/0103 427/294 |
| 2005/0196543 A1* | 9/2005 | Morton | B63B 59/00 427/421.1 |
| 2007/0180674 A1* | 8/2007 | Morden | G05B 19/402 29/407.01 |
| 2016/0271644 A1 | 9/2016 | Weinmann et al. | |
| 2018/0009000 A1* | 1/2018 | Shang | B25J 5/007 |
| 2019/0039338 A1* | 2/2019 | Linde | B29C 73/34 |

\* cited by examiner

FUEL TANK SEALANT APPLICATION SYSTEM

BACKGROUND

Some known aircraft include integral fuel tanks in the otherwise-unused space inside of its wings. These fuel tanks may include thousands of fastener ends and hundreds of feet of seams and flanges. To reduce leakage from these fuel tanks, such features may be coated with a sealant material. Known methods for sealing such features are manually performed and require a substantial amount of time. For example, a caulking gun or spatula may be used to apply a sufficient amount of sealant material onto each fastener end, seam, and flange. In certain situations, at least some fastener ends have been covered by caps filled with the sealant material. However, this remains a labor-intensive, time-consuming task.

SUMMARY

Examples of the disclosure enable one or more features to be automatically coated with a sealant material. In one aspect, an application system is provided for sealing a fuel tank. The application system includes one or more flow control mechanisms, including a dispenser device that dispenses one or more sealant materials for sealing the fuel tank, that control a flow path of the sealant materials, one or more position control mechanisms, including a robot arm coupled to the dispenser device, that control a position of the dispenser device, and one or more memory devices storing data associated with the flow control mechanisms, the position control mechanisms, one or more target areas, and computer-executable instructions. The computer-executable instructions may be executed by a processor to identify a first target area, actuate the position control mechanisms to move the dispenser device toward the first target area, actuate the flow control mechanisms to channel the sealant materials toward the dispenser device, dispense one or more first shots of the sealant materials onto the first target area using the dispenser device for forming a dollop at the first target area, and dispense one or more second shots of the sealant materials onto the first target area using the dispenser device for forming a sealant layer that overlies the dollop.

In another aspect, a method is provided for sealing a fuel tank. The method includes identifying a target area at the fuel tank, moving a dispenser device in fluid communication with a sealant source toward the identified target area, channeling one or more sealant materials from the sealant source toward the dispenser device, using the dispenser device to dispense a first amount of the sealant materials and form a dollop at the target area, and using the dispenser device to dispense a second amount of the sealant materials and form a sealant layer at the target area overlying the dollop.

In yet another aspect, a computing system is provided for use in sealing a fuel tank. The computing system includes one or more computer storage media including data associated with one or more control mechanisms and computer-executable instructions, and one or more processors. The processors execute the computer-executable instructions to identify a location of the fuel tank, utilize a robot system to move a dispenser device toward the identified location, and utilize a dispenser system to channel one or more sealant materials toward the dispenser device, dispense a first amount of the sealant materials for forming a dollop at the location, and dispense a second amount of the sealant materials for forming a sealant layer that overlies the dollop.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to sealing mechanisms and, more particularly, to systems and methods for sealing a fuel tank. Examples described herein include an application system that channels a sealant material toward a dispenser device for dispensing one or more first shots of the sealant material from the dispenser device to form a dollop at a target area and dispensing one or more second shots of the sealant material from the dispenser device to form a sealant layer that overlies the dollop. The dispenser device may be moved toward the target area using one or more position control mechanisms, and/or the sealant material may be channeled toward the dispenser device using one or more flow control mechanisms. The sealant material may be dispensed, for example, to provide a robust seal at the target area. While the examples described herein are described with respect to applying one or more sealant materials to fasteners of a fuel tank defined in within an otherwise-unused space inside of an aircraft's wings, one of ordinary skill in the art would understand and appreciate that the example systems and methods may be used to seal any surface or interface that forms a seal as described herein.

Figure 1:
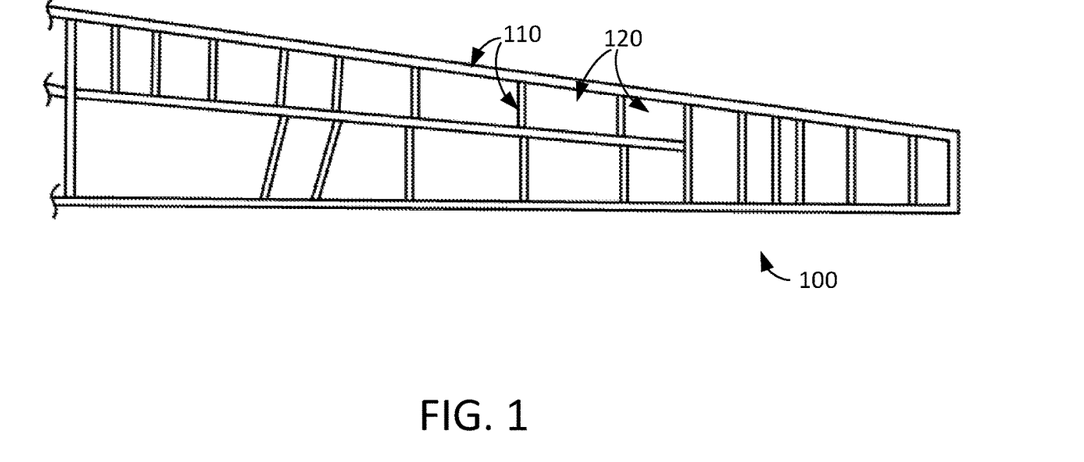
FIG. 1 includes a schematic plan view of an example aircraft wing.

FIG. 1 shows an example aircraft wing 100 including a plurality of support members 110. The support members 110 form a skeletal shape for the aircraft wing 100. Example support members 110 may include, without limitation, spars, ribs, longerons, stiffeners, and/or stringers. One or more panel members 120 extend generally over and between upper ends of the support members 110, and under and between lower ends of the support members 110 to form a skin of the aircraft wing 100.

Figure 2:
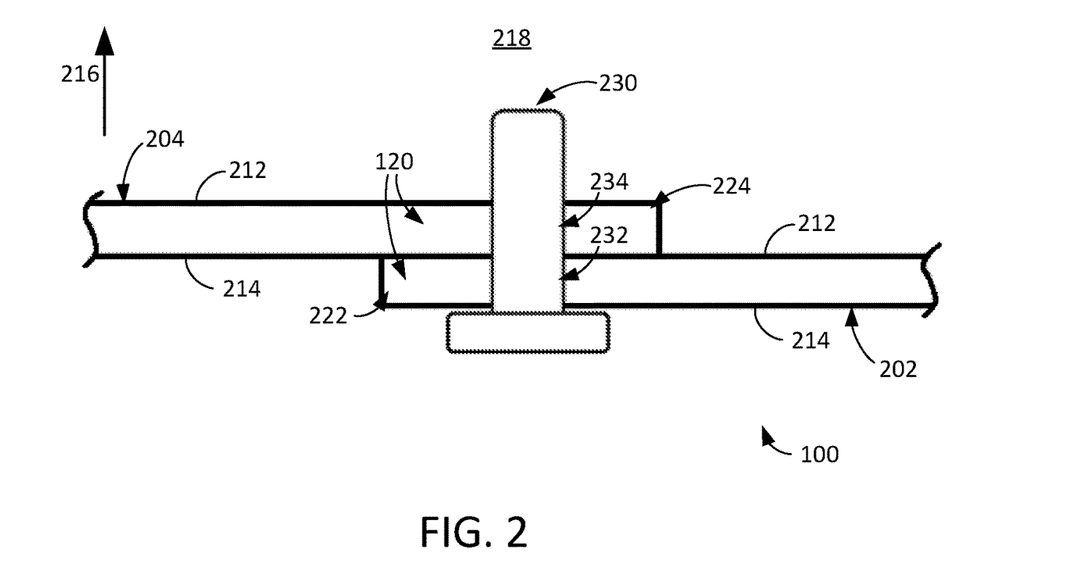
FIG. 2 includes a schematic partial cross section view of a portion of the aircraft wing shown in FIG. 1.

FIG. 2 shows a portion of the aircraft wing 100 including a plurality of panel members 120. As shown in FIG. 2, the panel members 120 include a first member 202 and a second member 204 coupled to the first member 202. Each panel member 120 has a first surface 212 and an opposing second surface 214, and the panel members 120 may be oriented such that the first surfaces 212 face an interior direction 216 and define a cavity 218 in which fuel may be held or stored. In some examples, a portion 222 of the first member 202 (e.g., a "first portion") extends generally exterior to and parallel with a portion 224 of the second member 204 (e.g., a "second portion") such that the first surface 212 of the first portion 222 faces the second surface 214 of the second portion 224.

The first member 202 and second member 204 may be securely coupled to each other using one or more coupling mechanisms 230. In some examples, the coupling mechanisms 230 are extended through an opening 232 defined in the first portion 222 and through an opening 234 defined in the second portion 224 for securely coupling the first member 202 and second member 204 to each other. The first member 202 and second member 204 may be positioned, for example, such that the first surface 212 of the first portion 222 engages the second surface 214 of the second portion 224 and the opening 232 defined in the first portion 222 is aligned with the opening 234 defined in the second portion 224. Example coupling mechanisms 230 may include, without limitation, bolts, screws, nuts, washers, anchors, rivets, rods, studs, and/or any other fastener that enables the first member 202 and second member 204 to be coupled to each other.

Figure 3:
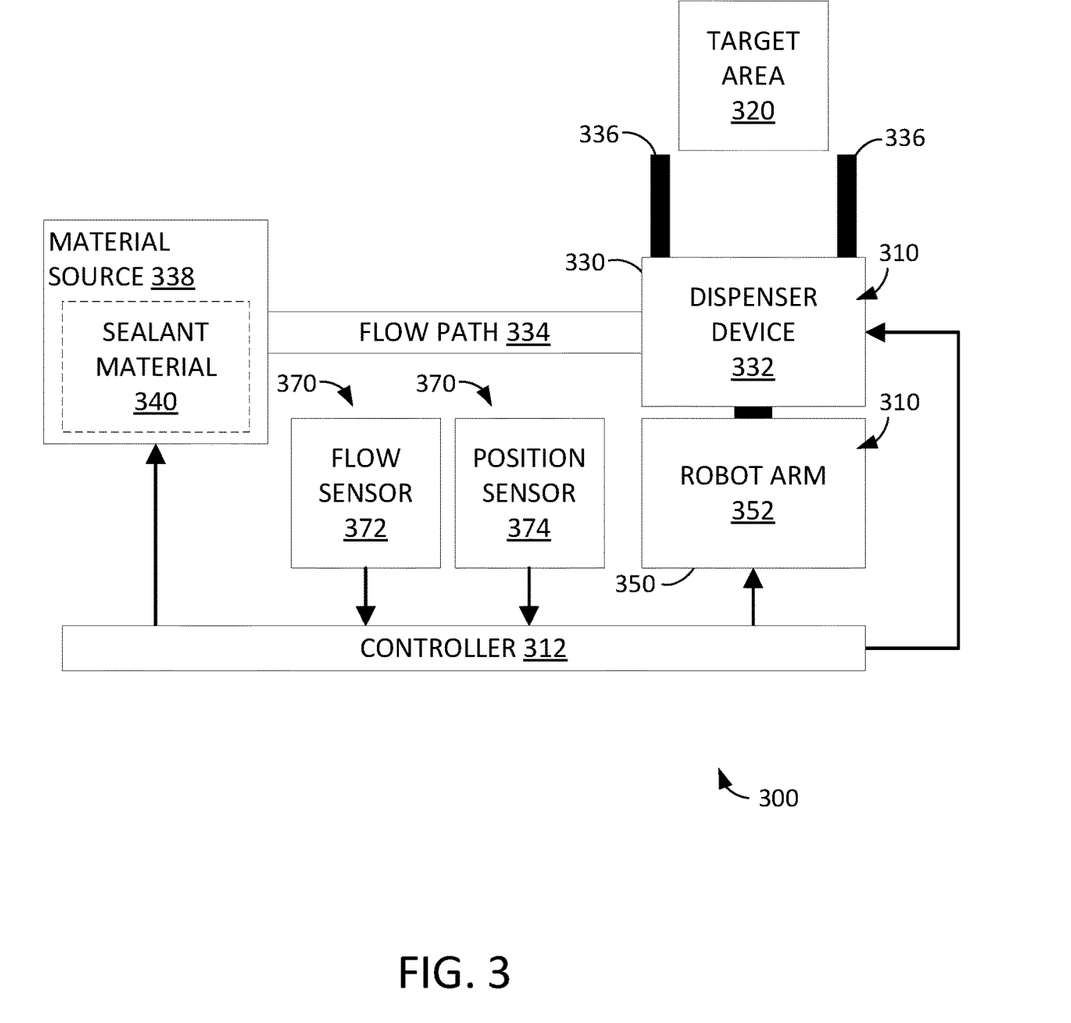
FIG. 3 includes a block diagram of an example application system for sealing a fuel tank, such as a fuel tank partially defined by the portion of the aircraft wing shown in FIG. 2.

FIG. 3 shows an example application system 300 including a plurality of control mechanisms 310, and a controller 312 that manages or controls the control mechanisms 310 to dispense one or more materials toward or onto one or more target areas 320 for sealing a surface or an interface between two surfaces at or proximate the target areas 320. Example target areas 320 include, without limitation, a surface of an object, such as a fastener (e.g., coupling mechanism 230) or a member (e.g., support member 110, panel member 120, first member 202, second member 204), and/or an interface between a plurality of surfaces of one or more objects. For example, the control mechanisms 310 may be controlled to dispense materials for sealing one or more gaps between a radially-inner surface defining an opening (e.g., opening 232, opening 234) and a radially-outer surface of an extension member extending through the opening (e.g., coupling mechanism 230). For another example, the control mechanisms 310 may be controlled to dispense materials for sealing one or more gaps between a plurality of members (e.g., support member 110, panel member 120, first member 202, second member 204).

The control mechanisms 310 include one or more flow control mechanisms 330, such as a nozzle or dispenser device 332, that control a flow path 334 to, from, and at the dispenser device 332. The flow control mechanisms 330 enable the materials to be delivered to and dispensed from the dispenser device 332 in a desired manner. For example, one or more flow control mechanisms 330 may be configured to dispense one or more materials in one or more predetermined amounts (e.g., an amount in a window including and between 2.0 cubic centimeters (cc), which is approximately 0.067 fluid ounces (fl. oz.), and 3.0 cc, which is approximately 0.102 fl. oz.). For another example, the flow control mechanisms 330 may include one or more sidewalls 336 configured to at least partially control or retain one or more materials after being dispensed from the dispenser device 332. In some examples, the sidewalls 336 form a socket-type nozzle that encapsulates an area (e.g., target area 320) for maintaining a shape of dispensed material (e.g., on a vertically-extending application surface). Example flow control mechanisms 330 include, without limitation, tanks, hoses, tubes, fittings, switches, valves, agitators, pumps, strainers, and/or any other mechanism that enables the materials channeled to and dispensed from the dispenser device 332 to be controlled.

In some examples, the dispenser device 332 is in fluid communication with a material source 338 such that the flow path 334 extends between the material source 338 and the dispenser device 332. The material source 338 may include one or more reservoirs, diaphragms, barrel pumps, and/or proportioners that control a composition, viscosity, volume, pressure, and/or flow rate of one or more materials delivered to the dispenser device 332 (e.g., via the flow path 334). The materials delivered from the material source 338 may include one or more sealant materials 340.

In some examples, the material source 338 includes one or more barrel pumps configured to control one or more volumes or proportions of one or more materials. Each barrel pump may correspond to a respective material and/or may be configured to control a volume of material channeled from the material source 338 toward the dispenser device 332. For example, the sealant materials 340 may include a first proportion of a first material from a first barrel pump, and a second proportion of a second material from a second barrel pump. Additionally or alternatively, the material source 338 may include a proportioner configured to control a material composition of one or more sealant materials 340. The proportioner may provide a substance having a specific composition and/or specific properties, including a compound with two or more chemical elements or a solution including two or more constituent substances. Example sealant materials 340 may include, without limitation, a two-part manganese dioxide cured polysulfide polymer, such as P/S 890® fuel tank sealant or PR-1776M™ fuel tank sealant, and/or any other material configured to brush seal a surface or fay seal a gap or interface between two surfaces ("P/S 890" and "PR-1776M" are trademarks of PRC-Desoto International, Inc., a subsidiary of PPG Industries, Inc.).

The control mechanisms 310 include one or more position control mechanisms 350, such as a robot arm 352 coupled to the dispenser device 332, that control a position, orientation, and movement of the dispenser device 332. For example, the dispenser device 332 may be moved in a plurality of directions with multiple degrees of freedom. The position control mechanisms 350 enable the dispenser device 332 to be moved to a desired position and orientation. Example position control mechanisms 350 include, without limitation, alternating current (AC) motors, direct current (DC) motors, servo motors, stepper motors, and/or any other mechanism that enables the dispenser device 332 to be moved.

The controller 312 is configured to identify one or more target areas 320 (e.g., a first target area), and dispense one or more materials toward or onto the target area 320 using the control mechanisms 310, including the dispenser device 332. In some examples, the controller 312 actuates the position control mechanisms 350 to position, orient, and move the dispenser device 332 toward the target area 320, and/or actuate the flow control mechanisms 330 to channel the materials (e.g., sealant material 340) toward the dispenser device 332 and/or target area 320. For example, the controller 312 may actuate the position control mechanisms 350 to move the dispenser device 332 in a first direction 362 and/or actuate the flow control mechanisms 330 to dispense one or more shots of the sealant material 340 onto the target area 320 for forming a dollop 364 (shown in FIGS. 4 and 5) at the target area 320. In some examples, the first direction 362 is generally toward and/or perpendicular to the target area 320. For another example, the controller 312 may actuate the position control mechanisms 350 to move the dispenser device 332 in a second direction 366 and/or actuate the flow control mechanisms 330 to dispense one or more shots of the sealant material 340 onto the target area 320 for forming a sealant layer 368 (shown in FIG. 5) at the target area 320. The sealant layer 368 may be formed to extend over or overlie a dollop 364 at the target area 320. In some examples, the second direction 366 is generally across or about the target area 320.

The application system 300 may include one or more sensors 370 at or proximate the control mechanisms 310 and/or target areas 320 to provide the controller 312 with information or feedback. Feedback provided by the sensors 370 may enable the application system 300 to function as described herein. For example, the feedback may be used to form the dollop 364 and/or sealant layer 368 in a desired manner. In some examples, the sensors 370 include one or more flow sensors 372 at or proximate the flow control mechanisms 330 and/or target areas 320 to selectively adjust a flow of one or more materials delivered to and/or dispensed from the dispenser device 332. The flow sensors 372 may be used to monitor the dispenser device 332, flow path 334, and/or target areas 320, and detect or identify one or more parameters associated with a state of the flow path 334 (e.g., composition, viscosity, volume, pressure, flow rate) and/or materials dispensed from the dispenser device 332 (e.g., volume, pressure, flow rate, shape, coverage). Example flow sensors 372 may include, without limitation, flow meters, pressure sensors, fluid composition sensors, optical sensors, acoustic sensors, and/or any other sensor that allow the controller 312 to detect the parameters described herein.

In some examples, the sensors 370 include one or more position sensors 374 at or proximate the position control mechanisms 350 and/or target areas 320 to selectively adjust a positioning, orientation, and movement of the dispenser device 332. The position sensors 374 may be used to monitor the dispenser device 332 and/or target areas 320, and detect or identify one or more parameters associated with a state of the dispenser device 332 (e.g., position, orientation, movement), target areas 320 (e.g., position, orientation, movement, coverage), dollop 364 (e.g., size, shape, coverage), and/or sealant layer 368 (e.g., size, shape, coverage). Example position sensors 374 may include, without limitation, optical sensors, acoustic sensors, and/or any other sensor that allow the controller 312 to detect the parameters described herein.

Figure 6:
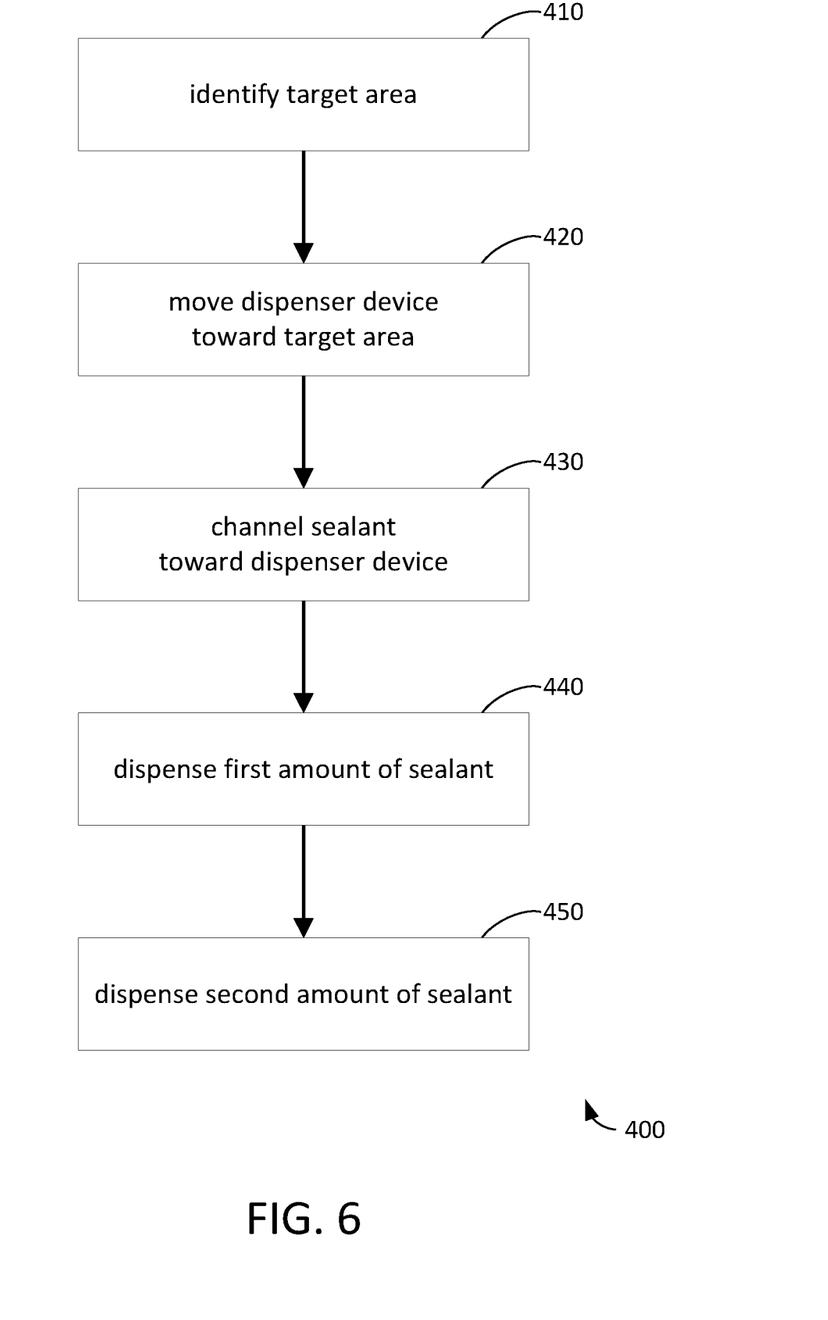
FIG. 6 includes a flowchart of an example method of using a sealing mechanism, such as the application system shown in FIG. 3, to seal a fuel tank, such as a fuel tank partially defined by the portion of the aircraft wing shown in FIG. 2

FIG. 6 shows an example method 400 of sealing a surface or an interface between two surfaces using a sealing mechanism. The application system 300 (shown in FIG. 3), for example, may be used to perform one or more operations of the method 400 for sealing one or more fuel tanks (e.g., at the aircraft wing 100). The method 400 may be implemented to prevent fuel from leaking or seeping through or around one or more components (e.g., support member 110, panel member 120, first member 202, second member 204, coupling mechanism 230).

In some examples, a target area 320 at a fuel tank is identified at operation 410. The target area 320 may be, for example, on a surface of a first member 202 of an aircraft wing 100 (shown in FIG. 2), a second member 204 of an aircraft wing 100 (shown in FIG. 2), a coupling mechanism 230 (shown in FIG. 2) extending through openings defined in a portion 222 of the first member 202 (e.g., opening 232) and/or a portion 224 of the second member 204 (e.g., opening 234), and/or at a gap or interface between any combination thereof. A location of the target area 320 may be predetermined or determined based on known information (e.g., a relative location). In some examples, the location of the target area 320 is determined based on one or more parameters detected or identified using one or more position sensors 374. The dispenser device 332 is moved toward the identified target area 320 at operation 420. A first target area may include, for example, an end portion of the coupling mechanism 230 (e.g., a fastener tip) and/or the first surface 212 of the second member 204.

Figure 4:
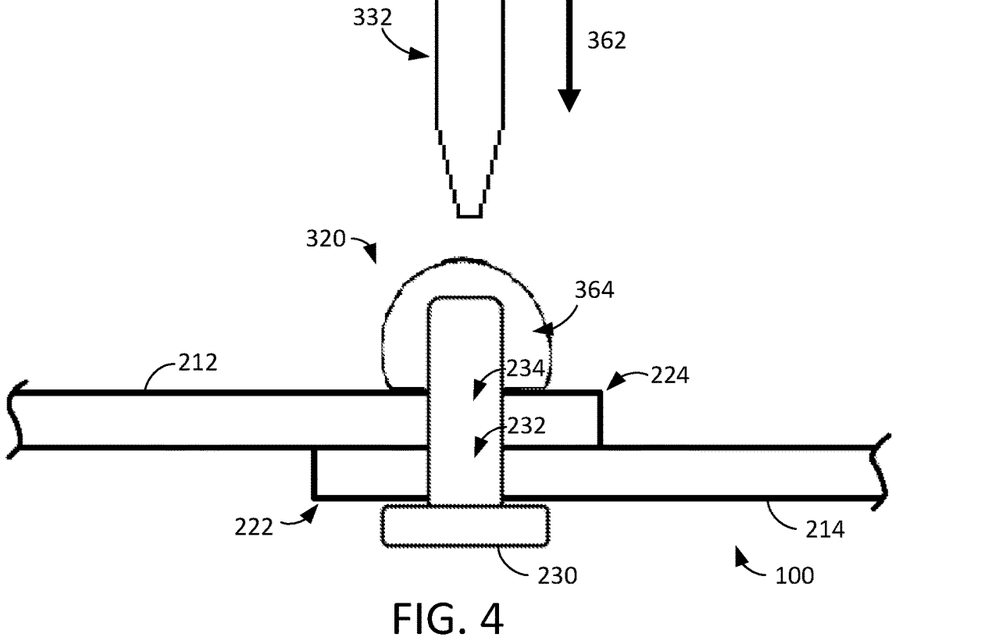
FIG. 4 includes a schematic partial cross section view of the portion of the aircraft wing shown in FIG. 2 in a first state.

One or more materials (e.g., sealant material 340) are channeled from a sealant source (e.g., material source 338) and toward the dispenser device 332 at operation 430. The flow control mechanisms 330 enable a dollop 364 that provides primary coverage to be formed at the target area 320. The dispenser device 332, for example, may be used to dispense a first amount of the sealant material 340 at operation 440 for forming the dollop 364 at the target area 320. FIG. 2 shows a portion of the aircraft wing 100 before the first amount of the sealant material 340 is dispensed at operation 440, and FIG. 4 shows the portion of the aircraft wing 100 after the first amount of the sealant material 340 is dispensed at operation 440.

The dollop 364 is configured to fill or cover a gap or interface between the coupling mechanism 230 and the first portion 222 (e.g., at opening 232) and/or second portion 224 (e.g., at opening 234). The position control mechanisms 350 may be used to perform one or more first passes over the target area 320, and/or the flow control mechanisms 330 may be used to dispense the sealant material 340 in one or more shots (e.g., one or more "first shots") having a size within a predetermined range. In some examples, the dispenser device 332 dispenses one or more first shots in 2.0-3.0 cc amounts for forming the dollop 364 until the dollop 364 encapsulates the end portion of the coupling mechanism 230 and/or has a predetermined thickness. The dollop 364 may be formed, for example, to have a thickness of at least 0.1 millimeters (mm), which is approximately 0.0039 inches (in.). As shown in FIG. 4, the first pass may include a vertical motion in a first direction 362 generally toward and perpendicular to a location at an inner surface of the aircraft wing 100 (e.g., first surface 212 of the second member 204) and/or generally in line with a longitudinal axis of the coupling mechanism 230. Feedback from one or more sensors 370 (e.g., flow sensor 372, position sensor 374) may be used to determine and/or identify whether the sealant material 340 is dispensed in one or more desired amounts and/or the dollop 364 has a desired size and/or shape. In some examples, the flow sensors 372 monitor a state of the sealant materials 340 at the flow path 334 and/or the target area 320, and one or more flow control mechanisms 330 are adjusted based on the monitoring.

Figure 5:
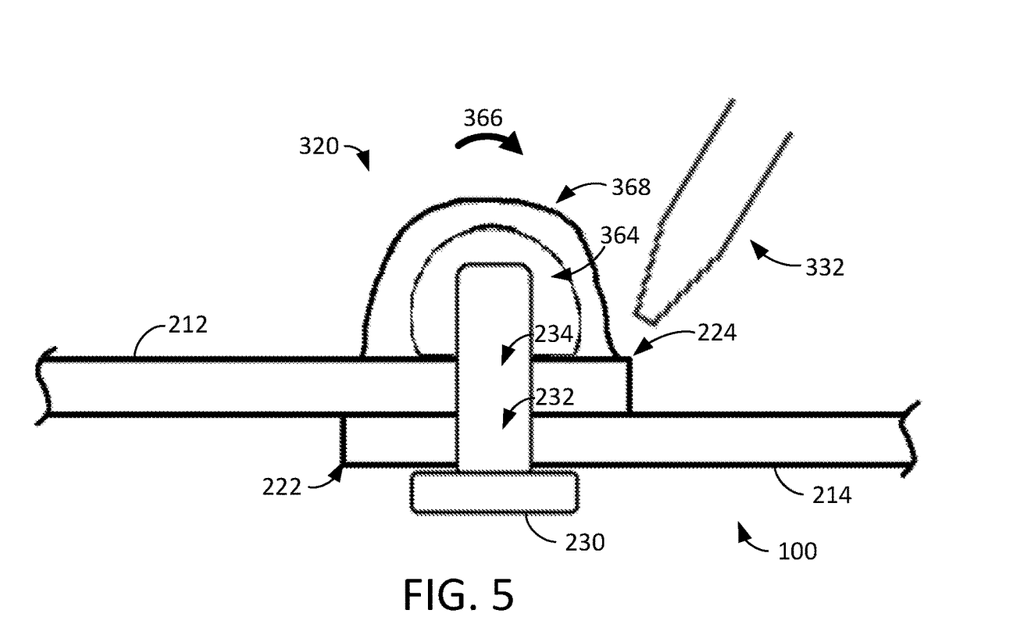
FIG. 5 includes a schematic partial cross section view of the portion of the aircraft wing shown in FIG. 2 in a second state.

The flow control mechanisms 330 enable a sealant layer 368 overlying the dollop 364 to be formed at the target area 320. The dispenser device 332, for example, may be used to dispense a second amount of the sealant material 340 at operation 450 for forming the sealant layer 368 at the target area 320 overlying the dollop 364. FIG. 4 shows the portion of the aircraft wing 100 before the second amount of the sealant material 340 is dispensed at operation 450, and FIG. 5 shows the portion of the aircraft wing 100 after the second amount of the sealant material 340 is dispensed at operation 450.

The sealant layer 368 is configured to provide additional coverage at the target area 320. As shown in FIG. 5, the sealant layer 368 may be configured to fill or cover a gap or interface between the dollop 364 and the second portion 224. The position control mechanisms 350 may be used to perform one or more second passes over the target area 320, and/or the flow control mechanisms 330 may be used to dispense the sealant material 340 in one or more shots (e.g., one or more "second shots") having a size within a predetermined range. In some examples, the dispenser device 332 dispenses one or more second shots in 2.0-3.0 cc amounts for forming the sealant layer 368 until the dollop 364 is covered or no longer exposed and/or until the formed seal, including the dollop 364 and the sealant layer 368, has a predetermined thickness. The predetermined thickness of a seal formed over an end portion of a coupling mechanism 230 as shown in FIG. 5, for example, may be at least 0.10 in. As shown in FIG. 5, the second pass may include an arcuate or curved motion in a second direction 366 generally across or about a surface of the dollop 364. In some examples, the second pass is made using a fan-shaped nozzle (e.g., another dispenser device) to apply a wide, fan-shaped ribbon or sheet of sealant material 340 over the dollop 364. Feedback from one or more sensors 370 (e.g., flow sensor 372, position sensor 374) may be used to determine and/or identify whether the sealant material 340 is dispensed in one or more desired amounts and/or the sealant layer 368 has a desired size and/or shape. In some examples, the position sensors 374 monitor a position of the dispenser device 332 and/or a location of the target area 320, and one or more position control mechanisms 350 are adjusted based on the monitoring.

Forming a sealant layer 368 may include dispensing more sealant material 340 than that dispensed while forming a dollop 364. This can be achieved in any combination of ways. For example, the dispenser device 332 may span or cover a distance or area greater than that covered while forming the dollop 364 (e.g., by using a larger nozzle, by moving in an arcuate or curved pattern, and/or by performing multiple second passes). For another example, the dispenser device 332 may be moved at a speed slower than that used while forming the dollop 364. For yet another example, the sealant material 340 may be dispensed at a shot size larger, a quantity greater, and/or a flow rate faster than those used while forming the dollop 364.

Additionally or alternatively, a seal may be formed at or proximate another target area (e.g., a second target area). Target areas 320 may include, for example, an opposing end portion of the coupling mechanism 230 (e.g., a fastener head) and/or the second surface 214 of the first member 202. To form a seal at the opposing end of the coupling mechanism 230 shown in FIGS. 2, 4, and/or 5, a dollop 364 may be formed by positioning the dispenser device 332 outside the aircraft wing 100 (e.g., on a side of the members 120 opposite the cavity 218) and moving the dispenser device 332 using a vertical motion in a direction opposite the first direction 362 (e.g., in the interior direction 216), and a sealant layer 368 may be formed using an arcuate or curved motion in a direction opposite the second direction 366 generally across or about a surface of the dollop 364.

In some examples, one or more sidewalls 336 are used to form the dollop 364 and/or sealant layer 368 in a desired size and/or shape. For example, when a target area 320 is at a vertical or inclined surface of a member (e.g., support member 110, panel member 120), the sidewalls 336 may be positioned to engage the surface for forming the dollop 364 and/or sealant layer 368 within a space or cavity defined by the surface and sidewalls 336. In this manner, at least some of the dispensed sealant materials 340 may be prevented from flowing or moving away from the target area 320 before solidifying or curing.

Figure 7:
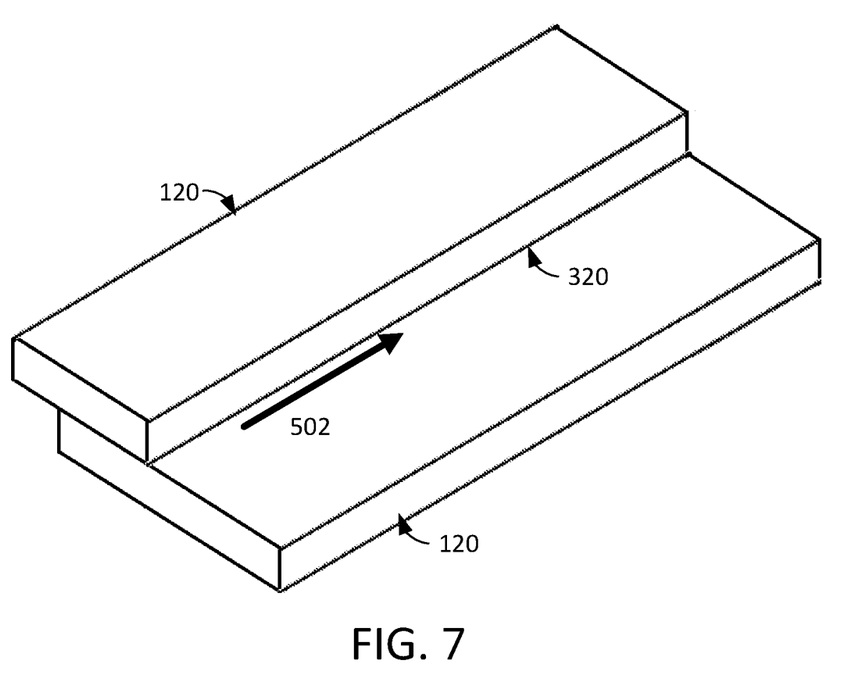
FIG. 7 includes a schematic perspective view of an elongated seam between two members that may be used to form an aircraft wing, such as the aircraft wing shown in FIG. 1.

FIG. 7 shows another target area 320 including an elongated seam between two members (e.g., support member 110, panel member 120). To form a flange or fillet seal at the elongated seam, an elongated "dollop" (e.g., dollop 364) may be formed by dispensing sealant material 340 while performing a first pass to move the dispenser device 332 generally in a longitudinal direction 502 along or parallel with the elongated seam. Then, an elongated "sealant layer" (e.g., sealant layer 368) may be formed over the elongated dollop by performing one or more second passes to move the dispenser device 332 generally in the longitudinal direction 502 along or parallel with the elongated seam. In some examples, the control mechanisms 310 (e.g., flow control mechanisms 330, position control mechanisms 350) are used to dispense the sealant material 340 until the formed flange or fillet seal (e.g., elongated dollop 364 and elongated sealant layer 368) has a predetermined thickness. The flange or fillet seal may be formed to have a thickness of at least 0.15 in., for example.

Figure 8:
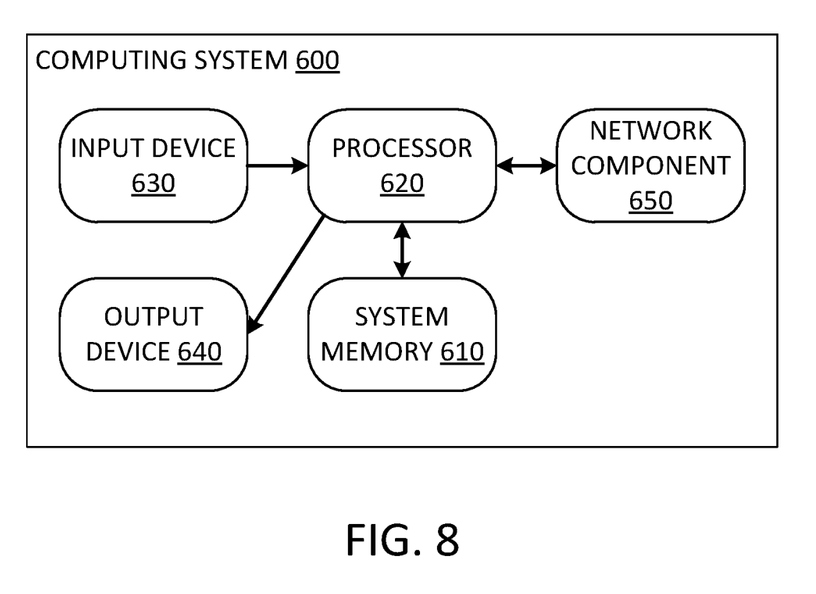
FIG. 8 includes a block diagram of an example computing system that may be used to seal a fuel tank, such as a fuel tank partially defined by the portion of the aircraft wing shown in FIG. 2.

FIG. 8 shows an example computing system 600 configured to perform one or more computing operations. While some examples of the disclosure are illustrated and described herein with reference to the computing system 600 being included in a controller 312 (shown in FIG. 3), aspects of the disclosure are operable with any computing system (e.g., control mechanisms 310, flow control mechanisms 330, position control mechanisms 350, sensors 370, flow sensors 372, position sensors 374) that executes instructions to implement the operations and functionality associated with the computing system 600. The computing system 600 shows only one example of a computing environment for performing one or more computing operations and is not intended to suggest any limitation as to the scope of use or functionality of the disclosure.

In some examples, the computing system 600 includes a system memory 610 (e.g., computer storage media) and a processor 620 coupled to the system memory 610. Although the processor 620 is shown separate from the system memory 610, examples of the disclosure contemplate that the system memory 610 may be onboard the processor 620, such as in some embedded systems. The system memory 610 stores data associated with the application system 300 and computer-executable instructions, and the processor 620 is programmed or configured to execute the computer-executable instructions for implementing aspects of the disclosure using the application system 300. For example, at least some data may be associated with one or more target areas 320, one or more control mechanisms 310 (e.g., flow control mechanisms 330, position control mechanisms 350), one or more sealant materials 340, and/or one or more sensors 370 (e.g., flow sensors 372, position sensors 374) such that the computer-executable instructions enable the processor 620 to manage or control one or more operations of a dispenser system including the flow control mechanisms 330 and/or flow sensors 372, and/or one or more operations of a robot system including the position control mechanisms 350 and/or position sensors 374.

In some examples, the processor 620 executes the computer-executable instructions to identify a location of a fuel tank (e.g., target area 320), utilize the robot system to move a dispenser device 332 (shown in FIG. 3) toward the identified location, and/or utilize the dispenser system to channel one or more sealant materials 340 (shown in FIG. 3) toward the dispenser device 332, dispense a first amount of the sealant materials 340 for forming a dollop 364 (shown in FIGS. 4 and 5) at the location, and/or dispense a second amount of the sealant materials 340 for forming a sealant layer 368 (shown in FIG. 5) that overlies the dollop 364. The processor 620 may include one or more processing units (e.g., in a multi-core configuration). A state of the dispenser system may be monitored (e.g., using one or more flow sensors 372), and one or more flow control mechanisms 330 may be adjusted based on the monitoring. Additionally or alternatively, a state of the robot system may be monitored (e.g., using one or more position sensors 374), and one or more position control mechanisms 350 may be adjusted based on the monitoring.

The system memory 610 includes one or more computer-readable media that allow information, such as the computer-executable instructions and other data, to be stored and/or retrieved by the processor 620. By way of example, and not limitation, computer-readable media may include computer storage media and communication media. Computer storage media are tangible and mutually exclusive to communication media. For example, the system memory 610 may include computer storage media in the form of volatile and/or nonvolatile memory, such as read only memory (ROM) or random access memory (RAM), electrically erasable programmable read-only memory (EEPROM), solid-state storage (SSS), flash memory, a hard disk, a floppy disk, a compact disc (CD), a digital versatile disc (DVD), magnetic tape, or any other medium that may be used to store desired information that may be accessed by the processor 620. Computer storage media are implemented in hardware and exclude carrier waves and propagated signals. That is, computer storage media for purposes of this disclosure are not signals per se.

A user or operator may enter commands and other input into the computing system 600 through one or more input devices 630 (e.g., sensors 370) coupled to the processor 620. The input devices 630 are configured to receive information (e.g., from the user). Example input device 630 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 640 coupled to the processor 620. The output devices 640 are configured to convey information (e.g., to the user). Example, output devices 640 include, without limitation, a monitor, a projector, a printer, a speaker, a vibrating component. In some examples, an output device 640 is integrated with an input device 630 (e.g., a capacitive touch-screen panel, a controller including a vibrating component).

One or more network components 650 may be used to operate the computing system 600 in a networked environment using one or more logical connections. Logical connections include, for example, local area networks and wide area networks (e.g., the Internet). The network components 650 allow the processor 620, for example, to convey information to and/or receive information from one or more remote devices, such as another computing system or one or more remote computer storage media. Network components 650 may include a network adapter, such as a wired or wireless network adapter or a wireless data transceiver.

Example sealing mechanisms are described herein and illustrated in the accompanying drawings. An automated application system is used to apply at least two layers of sealant material (e.g., at a wing of an aircraft) for creating a robust seal at a target area. For example, one or more shots of the sealant material may be dispensed onto the target area for forming a dollop at the target area, and then one or more shots of the sealant material may be dispensed onto the dollop (e.g., at the target area) for forming a sealant layer that overlies the dollop.

The examples described herein enable many features to be automatically coated with a sealant material in a quick, efficient, and user-friendly manner. For example, the examples described herein are able to readily access fasteners, seams, and/or flanges in what would otherwise be tough-to-reach spaces. With the sheer number of fasteners, seams, and/or flanges in an aircraft, automatically applying sealant material using the examples described herein may save hundreds of man-hours per aircraft. Moreover, the examples described herein allow the sealant material to be consistently applied within specifications without the use of seal caps, potentially saving thousands of dollars in material cost and waste reduction. This written description uses examples to disclose aspects of the disclosure and also to enable a person skilled in the art to practice the aspects, including making or using the above-described systems and executing or performing the above-described methods.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, safety equipment.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An application system for sealing a fuel tank, the application system comprising:
    one or more flow control mechanisms that control a flow path of one or more sealant materials, the one or more flow control mechanisms including a dispenser device configured to dispense the one or more sealant materials for sealing the fuel tank;
    one or more position control mechanisms including a robot arm coupled to the dispenser device, the one or more position control mechanisms configured to control a position of the dispenser device; and
    one or more memory devices storing data associated with the one or more flow control mechanisms, the one or more position control mechanisms, one or more target areas, and computer-executable instructions; and
    a processor configured to execute the computer-executable instructions to:
        identify a first target area of the one or more target areas;
        actuate the one or more position control mechanisms to move the dispenser device toward the first target area;
        actuate the one or more flow control mechanisms to channel the one or more sealant materials toward the dispenser device for use in dispensing a plurality of shots onto the first target area to form a seal having a predetermined seal size over the first target;
        dispense one or more first shots of the plurality of shots onto the first target area using the dispenser device for forming a dollop at the first target area, the dollop having a dollop size smaller than the predetermined seal size; and
        dispense one or more second shots of the plurality of shots onto the first target area using the dispenser device for forming a sealant layer that overlies the dollop such that the seal having the predetermined seal size is formed.

2. The application system of claim 1 further comprising a sealant source in fluid communication with the dispenser device, wherein the flow path controlled by the one or more flow control mechanisms is between the sealant source and the dispenser device.

3. The application system of claim 1 further comprising a sealant source in fluid communication with the dispenser device, the sealant source including one or more barrel pumps configured to control one or more volumes of the one or more sealant materials, each barrel pump of the one or more barrel pumps corresponding to a respective sealant material of the one or more sealant materials.

4. The application system of claim 1 further comprising a sealant source in fluid communication with the dispenser device, the sealant source including a proportioner configured to control a material composition of the one or more sealant materials.

5. The application system of claim 1, wherein the dispenser device is configured to dispense the one or more first shots and the one or more second shots such that each of the one or more first shots and the one or more second shots has a size within a predetermined range.

6. The application system of claim 1, wherein the dispenser device is configured to dispense the one or more first shots such that each of the one or more first shots has a size between approximately 0.067 fluid ounces and 0.102 fluid ounces.

7. The application system of claim 1, wherein the dispenser device is configured to dispense the one or more second shots such that each of the one or more second shots has a size between approximately 0.067 fluid ounces and 0.102 fluid ounces.

8. The application system of claim 1, wherein the dispenser device is configured to dispense a first quantity of the one or more first shots, and dispense a second quantity of the one or more second shots, the second quantity greater than or equal to the first quantity.

9. The application system of claim 1, wherein the dispenser device includes a sidewall configured to at least partially retain one or more of the dispensed one or more first shots or the dispensed one or more second shots.

10. The application system of claim 1 further comprising one or more sensors coupled to the processor for monitoring a state of the one or more sealant materials at one or more of the flow path or the first target area, the processor further configured to adjust the one or more flow control mechanisms based on the monitoring.

11. The application system of claim 1 further comprising one or more sensors coupled to the processor for monitoring one or more of the position of the dispenser device or a location of the first target area, the processor further configured to adjust the one or more position control mechanisms based on the monitoring.

12. A computing system for use in sealing a fuel tank, the computing system comprising:
    one or more computer storage media including data associated with a plurality of control mechanisms including a position control mechanism and a flow control mechanism and computer-executable instructions; and
    one or more processors configured to execute the computer-executable instructions to:
        identify a target area of the fuel tank,
        actuate the position control mechanism to move a dispenser device toward the identified target area,
        actuate the flow control mechanism to channel one or more sealant materials toward the dispenser device,
        dispense one or more first shots of the one or more sealant materials onto the target area for forming a dollop at the target area, and dispense one or more second shots of the one or more sealant materials onto the target area for forming a sealant layer that overlies the dollop such that a seal having a predetermined seal size is formed, wherein the seal includes the dollop and the sealant layer, and the dollop has a dollop size smaller than the predetermined seal size.

13. The computing system of claim 12, wherein the one or more processors are further configured to execute the computer-executable instructions to monitor a state of the flow control mechanism, and adjust the flow control mechanism based on the monitoring.

14. The computing system of claim 12, wherein the one or more processors are further configured to execute the computer-executable instructions to monitor a state of the position control mechanism, and adjust the position control mechanism based on the monitoring.

* * * * *